United States Patent [19]

Neumann

[11] 3,964,569
[45] June 22, 1976

[54] GAS TURBINE ENGINE NOISE SHIELD

[75] Inventor: Gerhard Neumann, Swampscott, Mass.

[73] Assignee: General Electric Company, Cincinnati, Ohio

[22] Filed: Sept. 6, 1974

[21] Appl. No.: 503,750

[52] U.S. Cl. .................. 181/33 HA; 181/64 A; 415/119
[51] Int. Cl.² ............................................. E04B 1/99
[58] Field of Search ........ 181/33 H, 33 HA–33 HD, 181/64 R, 64 A; 137/15.1, 611; 415/119; 239/127.3, 521, 523

[56] References Cited
UNITED STATES PATENTS

| | | | |
|---|---|---|---|
| 2,970,431 | 2/1961 | Harshman | 137/611 |
| 3,027,710 | 4/1962 | Maytner | 239/121.3 |
| 3,481,427 | 12/1969 | Dobbs | 181/33 G |
| 3,545,464 | 12/1970 | Brown | 181/33 HA |
| 3,565,208 | 2/1971 | Millman | 181/33 HD |
| 3,590,944 | 7/1971 | Millman | 181/33 HD |
| 3,621,933 | 11/1971 | Raynes | 181/33 HD |
| 3,717,163 | 2/1973 | Herr | 137/15.1 |
| 3,739,984 | 6/1973 | Tontini | 181/33 HB |
| 3,750,689 | 8/1973 | Britt | 137/15.1 |
| 3,820,626 | 6/1974 | Bonneaud et al. | 181/33 HC |

Primary Examiner—L. T. Hix
Assistant Examiner—Vit W. Miska
Attorney, Agent, or Firm—Robert C. Lampe, Jr.; Derek P. Lawrence

[57] ABSTRACT

Positionable deflector means are provided in a gas turbine engine inlet duct. The deflector means are actuated to change the axial and circumferential location of a forward protruding extension of the inlet duct in order to selectively reduce noise propagation. A method is disclosed for directional noise shielding as a gas turbine engine experiences altitude and operational changes.

14 Claims, 6 Drawing Figures

GAS TURBINE ENGINE NOISE SHIELD

BACKGROUND OF THE INVENTION

In the present era of environmental awareness, the gas turbine engine designer, and particularly the designer of such engines for aircraft propulsion, is faced with the dilemma of reducing engine pollutants with a minimum sacrifice of engine performance. One type of pollution which recently has received considerable attention is noise.

Gas turbine engine noise is generated from two primary sources: first, there is that associated with the viscous shearing of rapidly moving gases exhausted into the relatively quiescent surrounding atmosphere. In turbofan aircraft engines, such gases are emitted from the fan and core nozzles at the rear of the engine. Various approaches have been utilized to reduce this "shear" noise, most approaches incorporating mixers to comingle fan and exhaust gases with each other and with the surrounding environment.

The second source of noise, and the one to which the present invention is directed, is generated by the rotating turbomachinery itself, the result of rapidly rotating blade rows disposed within the gas stream. The noise is affected by such parameters as blade rotational speed, blade-to-blade spacing, blade geometry and also by the proximity of stationary hardware to such rotating blade rows, as in the case of an outlet guide vane arrangement and in typical multistage axial compressors where stationary blade rows are alternated with rotating blade rows. Some of the noise generated in this manner can be absorbed and suppressed by means of acoustic or sound absorbing paneling disposed about the periphery of the nacelle enclosing the rotating turbomachinery. Such sound-absorbing material is well known in the art. However, a significant percentage of noise propagates forward from the gas turbine inlet duct due to the proximity of the fan or compressor to the inlet frontal plane and the lack of forward shielding in the forward direction. The problem, therefore, facing the gas turbine designer is to provide a means for attenuating this forward propagating noise without incurring overall performance penalties.

Prior state of the art concepts to attempt to solve this problem have concentrated on the addition of sound-absorbing material upon the inlet duct inner wall. This does little to attenuate unreflected noise propagating in the axially forward direction. Additional benefits have been obtained by providing coaxial, circumferential rings of sound absorbent material within the inlet. However, such rings produce a loss of inlet total pressure and, therefore, performance losses which remain throughout the engine operating envelope even where noise propagation presents no hazard or nuisance to inhabitants below.

Another concept incorporates an axially translating scoop on the bottom of the inlet duct to selectively reduce the downward transmission of noise from the inlet. However, this concept does little to protect against the nuisance of noise in one of the most critical engine operating regimes; that is, when the engine is at ground altitude. Downward propagating noise in this environment is shielded by the ground itself, while side propagating noise remains unattenuated.

SUMMARY OF THE INVENTION

Accordingly, it is the primary object of this invention to selectively reduce aerodynamically induced noise propagating from the inlet of a gas turbine engine without sacrificing overall engine performance.

This and other objects and advantages will be more clearly understood from the following detailed description, the drawings and specific examples, all of which are intended to be typical of rather than in any way limiting the present invention.

Briefly stated, the above object is attained by providing a movable noise deflector about the inlet duct and scheduling, through an actuating means, the change in axial and circumferential position of the deflector in relation to the engine operating environment. As the altitude and operating environment of the engine change, the deflector can be programmed to shield the noise in those directions deemed most objectionable. In an alternative embodiment, a plurality of deflector members is provided about the periphery of the inlet duct, these members being axially translatable with respect to the fixed inlet duct. Predetermined of these members may be translated forward of the fixed inlet frontal plane, again providing directional noise shielding. While this invention will aid in inlet noise suppression, most significant is that it will accomplish this suppression without overall engine performance penalties since there is no encroachment into the stream of air entering the engine.

DESCRIPTION OF THE DRAWINGS

While the specification concludes with a series of claims particularly pointing out and distinctly claiming the subject matter which is regarded as part of the present invention, it is believed that the invention will be more fully understood from the following description of the preferred embodiments which are given in connection with the accompanying drawings, in which:

DESCRIPTION OF THE PREFERRED EMBODIMENT

Figure 1:
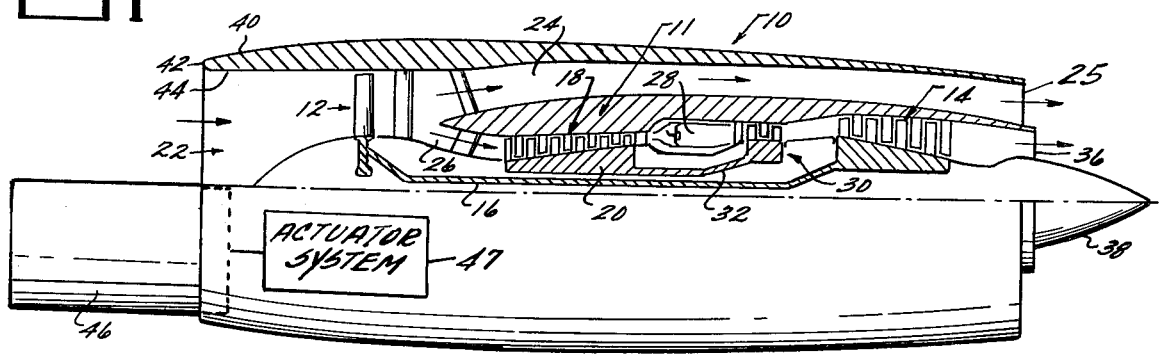
FIG. 1 is a schematic representation of a gas turbine engine incorporating the subject invention.

Referring to the drawings wherein like numerals correspond to like elements throughout, reference is initially directed to FIG. 1 wherein an engine depicted generally at 10 embodying the present invention is diagrammatically shown. This engine may be considered as comprising generally a core engine 11, a fan assembly 12, and a fan turbine 14 which is interconnected to the fan assembly 12 by shaft 16. The core engine 11 includes an axial flow compressor 18 having a rotor 20. Air enters inlet assembly 22 and is initially compressed by fan assembly 12. A first portion of this compressed air enters the fan bypass duct 24 and subsequently discharges through a fan nozzle 25. A second portion of the compressed air enters inlet 26, is further compressed by the axial flow compressor 18 and then is discharged to a combustor 28 where fuel is burned to provide high energy combustion gases which drive a turbine 30. The turbine 30, in turn, drives the rotor 20 through a shaft 32 in the usual manner of a gas turbine engine. The hot gases of combustion then pass to and drive the fan turbine 14 which, in turn, drives the fan assembly 12. The propulsive force is thus obtained by the action of the fan assembly 12, discharging air from the fan bypass duct 24 through the fan nozzle 34 and by the discharge of combustion gases from a core engine nozzle 36 defined, in part, by plug 38.

The above description is typical of many present-day engines and is not meant to be limiting, as it will become readily apparent from the following description that the present invention is capable of application to any gas turbine engine with or without a fan and may be used to selectively shield noise propagating from any type of duct. The above description of the engine depicted in FIG. 1 is therefore merely meant to be illustrative of one type of application.

Figure 2:
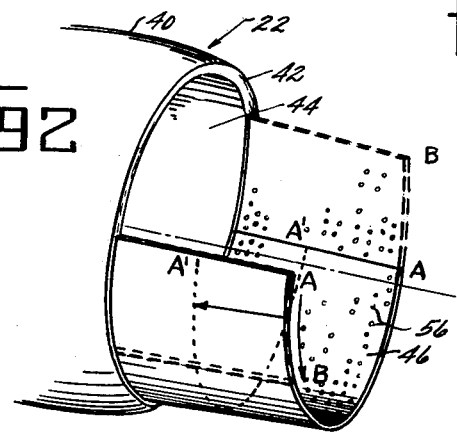
FIG. 2 is an enlarged, isometric view of the gas turbine engine inlet of FIG. 1 incorporating the present invention.

Referring now to FIG. 2, the inlet assembly 22 of FIG. 1 is shown to include a fixed cylindrical duct 40, a lip 42 defining an inlet frontal plane 44 and a movable, arcuate deflector member 46 essentially coaxial with the fixed duct longitudinal axis. The deflector member 46 is operatively connected by one of a variety of state of the art actuators 47 (FIG. 1) to the fixed inlet duct. Such an actuator is capable of translating the deflector 46 from a stowed position essentially flush with the inlet frontal plane 44 to an extended position designated A—A ahead of the inlet frontal plane. It would further be capable of rotating the deflector 46 from a first predetermined circumferential position A—A to a second predetermined circumferential position B—B.

Figure 3:
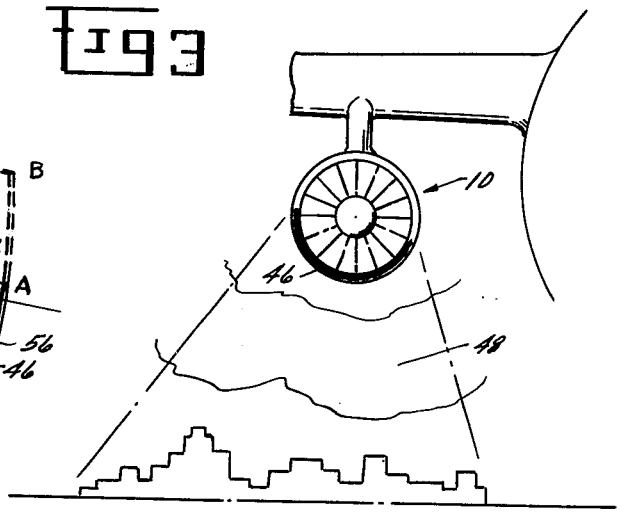
FIG. 3 is a schematic representation of the utilization of the present invention to suppress/deflect noise in a predetermined circumferential direction.
Figure 4:
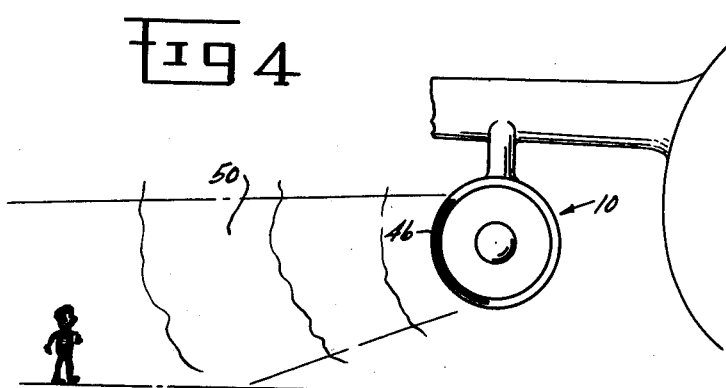
FIG. 4 is similar to FIG. 3 and represents the present invention being utilized in an alternative embodiment.

Typically, noise produced by a gas turbine engine is transmitted equally in all directions forward of the inlet frontal plane 44. Since gas turbine engines find their predominant application in aircraft propulsion, as the aircraft changes altitude and orientation the noise creating a nuisance to fixed targets (such as towns, persons, homes, etc.) is that radiating from different inlet circumferential locations. For example, FIG. 3 depicts a gas turbine engine 10 installed on an aircraft wherein the aircraft is in a relatively low altitude operating condition, such as take-off or landing. In such an orientation, the objectionable noise is that transmitted in the essentially downward direction within circumferential sector 48. However, during ground operations, objectionable noise is typically that radiating from the side of the engine inlet (sector 50, FIG. 4) since the ground itself serves as a deflector of sound in the downward direction (and rarely is there a target requiring protection in that location while an aircraft is on the ground).

Figure 5:
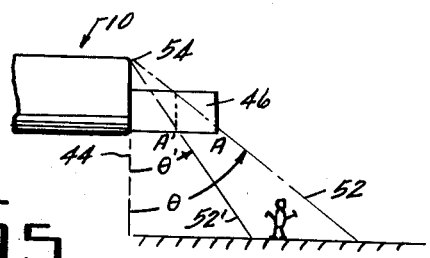
FIG. 5 is a schematic representation of the utilization of the present invention to deflect noise in the axial direction.

The present invention provides a means of selectively shielding noise in predetermined directions to provide continual protection as the gas turbine engine and aircraft change operating orientation. In the preferred embodiment of FIG. 2, the arcuate deflector member 46 is positionable about the circumference of the inlet lip 42 and is also axially translatable with respect to the fixed inlet 22. As depicted in FIG. 5, with the deflector member 46 extended from the inlet frontal plane to position A, sound suppression is provided in an area essentially within the included angle $\theta$ constructed between the inlet frontal plane 44 and the line 52, wherein line 52 is drawn from a point 54 on the inlet lip opposite the deflector member 46 tangent to the forward-most extension of the deflector member 46. As the deflector member is withdrawn to position A', only the area within included angle $\theta'$ (between plane 44 and line 52') receives the benefit of sound suppression. Therefore, by varying the axial extension of the deflector member 46 selective shielding in the essentially axial direction may be obtained. At predetermined altitudes, above which gas turbine engine noise is no longer objectionable to inhabitants below, the deflector member 46 can be withdrawn flush with the inlet frontal plane. Additionally, by rotating the deflector member 46 about the circumference of the inlet the zone of protection may be altered as, for example, from sector 48 to sector 50 of FIGS. 3 and 4, respectively. Suppression may be further enhanced by providing sound absorbing material 56 upon the radially inward surface of the deflector member 46.

Figure 6:
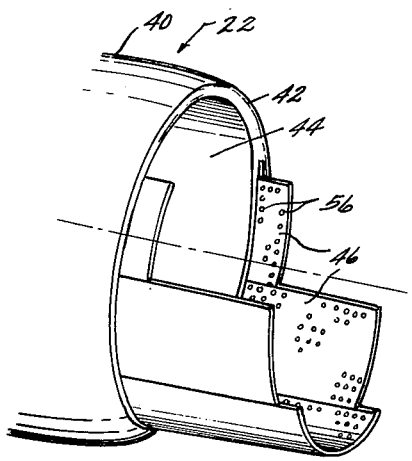
FIG. 6 is similar to FIG. 2 and represents an alternative embodiment of the subject invention.

An alternative embodiment of the subject invention appears in FIG. 6. Therein, a plurality of movable, arcuate deflector members 46 are disposed about the circumference of the inlet duct 22, each axially translatable with respect to the inlet duct and capable of extension forward of the fixed inlet frontal plane 44. Directional sound deflection is attained through selective axial positioning of a predetermined number of deflector members 46. Again, one of a variety of state of the art actuating means is adaptable to this purpose. As is readily apparent, the results of selective sound suppression of the alternative embodiment of FIG. 6 are similar to the results obtained in the embodiment of FIG. 2. Significantly, in neither embodiment is it contemplated that any structure extend into the inlet frontal plane 44 to disrupt the flow of air. Therefore, no reduction of inlet total pressure will be produced resulting in overall engine performance degradation.

It should be obvious to one skilled in the art that certain changes can be made to the above-described invention without departing from the broad inventive concepts thereof. For example, a plurality of axially and circumferentially movable deflector members could be employed in the embodiment of FIG. 2 to provide simultaneous protection in multiple circumferential sectors. Also, the inlet need not be cylindrical and the deflector members need not be arcuate. Additionally, this invention contemplates the utilization of the deflector members to inhibit the ingestion of foreign objects into the inlet when the engine is operating in a near ground level environment, either in conjunction with sound suppression, or singly when sound suppression is of no importance. It is intended that the appended claims cover these and all similar variations in the present invention's broader inventive concept.

What I claim is:

1. A gas turbine engine inlet assembly for selectively reducing noise propagation, said inlet assembly including: an inlet duct and movable deflector means, wherein said deflector means are operatively connected to an actuating means such that said deflector means are axially positionable at a first effective operating position within a first sector of said inlet duct, and further axially positionable in at least a second effective operating position within a second sector of said inlet duct, and said second sector is circumferentially disposed from said first sector.

2. The inlet assembly of claim 1 wherein said inlet duct is essentially a cylindrical fixed inlet duct.

3. The inlet assembly of claim 1 wherein said first sector is disposed at essentially the bottom of said inlet duct.

4. The inlet assembly of claim 2 wherein said deflector means comprises at least one circumferentially arcuate deflector member essentially coaxial with the inlet longitudinal axis and circumscribing a predetermined portion of the inlet duct perimeter.

5. The inlet assembly of claim 4 wherein:
said inlet duct defines an inlet frontal plane;
said deflector member is disposed at a first predetermined axial position in essentially axial alignment with said frontal plane; and
said actuating means includes axial positioning means operatively connected to said deflector member to axially position said deflector member from said first predetermined axial position to at least one other predetermined axial position forward of the inlet frontal plane, thereby creating a forward protruding extension of said inlet duct.

6. The inlet assembly of claim 4 wherein said deflector member includes a sound absorbing material disposed on a surface thereof.

7. The inlet assembly of claim 5 wherein said actuating means further includes means to rotate said deflector member from said first to said second sector of the inlet duct.

8. The inlet assembly of claim 5 comprising at least one other deflector member.

9. The inlet assembly of claim 8 wherein said actuating means is connected to said deflector members so that predetermined deflector members are translated from said first to second predetermined axial positions, respectively.

10. In a method of selectively reducing noise propagation from a gas turbine engine inlet comprising a fixed inlet duct and an axially positionable deflector means positioned within said duct, said method including the step of axially translating said deflector means with respect to said fixed inlet duct, the additional step of:
rotating said deflector means from a first to a second predetermined circumferential sector of the inlet duct.

11. The method of claim 10 wherein said inlet duct is essentially a cylindrical fixed inlet duct, and said inlet duct defines a frontal plane.

12. The method of claim 10 comprising the further step of:
scheduling, through an actuating means, the position of said deflector means such that at ground altitude said deflector is axially extended forward of said fixed inlet frontal plane and disposed within said second sector to shield side propagating noise radiating from said inlet, and whereby, as altitude is increased, said deflector is rotated to said first predetermined sector to shield downward propagating noise.

13. The method of claim 12 comprising the further step of:
scheduling the retraction of said deflector means by said actuating means whereby, at predetermined altitudes, said deflector means is substantially flush with said fixed inlet frontal plane.

14. A method of selectively reducing noise propagation from a gas turbine engine inlet including a fixed inlet duct defining a frontal plane and a plurality of axially positionable deflector members substantially circumscribing said inlet duct, said method including the steps of:
axially positioning at least a first one of said deflector members essentially flush with said fixed inlet duct frontal plane and at least a second one of said deflector members forward of said fixed inlet duct frontal plane during a first operating condition of the engine said second one of said deflector members being circumferentially spaced from said first one of said deflector members; and
retracting said previously extended deflector members to a position essentially flush with said fixed inlet frontal plane and essentially simultaneously axially extending said other of said deflector members forward of said fixed inlet duct frontal plane during a second operating condition of the engine.

* * * * *